(12) United States Patent
Huang

(10) Patent No.: US 6,910,276 B2
(45) Date of Patent: Jun. 28, 2005

(54) CUTTER STRUCTURE OF HEDGE TRIMMER

(76) Inventor: Andy Huang, No. 33-15, Yide S. Rd., Changhua City, Changhua County 500 (TW)

( * ) Notice: Subject to any disclaimer, the term of this patent is extended or adjusted under 35 U.S.C. 154(b) by 0 days.

(21) Appl. No.: 10/844,508

(22) Filed: May 13, 2004

(65) Prior Publication Data

US 2005/0044720 A1 Mar. 3, 2005

(30) Foreign Application Priority Data

Aug. 28, 2003 (TW) .................................. 09221563 U

(51) Int. Cl.[7] .............................................. B26B 19/04
(52) U.S. Cl. ............................................ 30/223; 30/216
(58) Field of Search .......................... 30/210, 216, 221, 30/222, 223, 224, 225

(56) References Cited

U.S. PATENT DOCUMENTS

| | | | | |
|---|---|---|---|---|
| 3,200,493 A | * | 8/1965 | Dodegge | 30/216 |
| 3,293,746 A | * | 12/1966 | Maxson | 30/223 |
| 3,798,768 A | * | 3/1974 | Cowley et al. | 30/223 |
| 4,619,045 A | * | 10/1986 | Mayer | 30/216 |
| 5,075,972 A | * | 12/1991 | Huang | 30/216 |
| 5,153,996 A | * | 10/1992 | Kuzarov et al. | 30/223 |
| 5,426,856 A | * | 6/1995 | Aiyama et al. | 30/208 |
| 5,581,891 A | * | 12/1996 | Wheeler et al. | 30/216 |

* cited by examiner

Primary Examiner—Hwei-Siu Payer
(74) Attorney, Agent, or Firm—Bacon & Thomas PLLC

(57) ABSTRACT

A cutter assembly includes a cutter support member made of aluminum or magnesium-aluminum alloy, a plurality of friction blocks mounted to a groove at a bottom side of the cutter support member, two cutter blades arranged in a stack and supported on the friction blocks, and fasteners respectively fastened to the friction blocks to secure the cutter blades to the cutter support member for enabling the cutter blades to be moved alternately relatively to each other.

7 Claims, 6 Drawing Sheets

CUTTER STRUCTURE OF HEDGE TRIMMER

BACKGROUND OF THE INVENTION

1. Field of the Invention

The present invention relates to a hedge trimmer, and more particularly, to a cutter structure for a hedge trimmer that is lightweight and durable for use.

2. Description of the Related Art

A regular hedge trimmer, as shown in FIGS. 5 and 6, is generally comprised of a motor base 5, an electric motor (not shown) mounted inside the motor base 5, and a saw-toothed cutter assembly extending outwards from the motor base 5. The cutter assembly includes a cutter support member 6 and two intercrossed cutter blades 7 longitudinally movably mounted to the cutter support member 6 by screws 8 and each having a plurality of teeth 71. When the electric motor is activated, the cutter blades 7 are eccentrically driven by the motor for alternating cutting movement.

According to this design, the cutter support member 6 and the cutter blades 7 are made of heavy metal and extend for a certain length. Because of heavy weight and lengthy moment, the user must hold the motor base 5 with much effort while trimming hedge. If the cutter support member 6 is made of aluminum instead of heavy metal, the cutter support member 6 can be lightweight but will be subject to wear quickly due to severe friction between the cutter support member 6 and the cutter blades 7, and the screws 8 will be subject to looseness soon to cause overmuch gap and to further incur looseness of the cutter blades 7.

SUMMARY OF THE INVENTION

The primary object of the present invention is to provide an improved cutter assembly for a hedge trimmer; the cutter assembly is lightweight and durable for use. The secondary object of the present invention is to provide an improved cutter assembly for a hedge trimmer; blades are not subject to looseness from the cutter assembly.

To attain the foregoing objects, the present invention provides the improved cutter assembly, which includes a cutter support member made of light metal (aluminum or magnesium-aluminum alloy), a plurality of friction blocks mounted to a groove at a bottom side of the cutter support member, two cutter blades arranged in a stack and supported on the friction blocks, and fasteners respectively fastened to the friction blocks to secure the cutter blades to the cutter support member for enabling the cutter blades to be moved alternately relatively to each other.

Because the cutter support member is made of light metal, the total weight of the cutter assembly is relatively reduced. Therefore, the user can use the hedge trimmer conveniently with less effort. Because friction blocks are provided to protect the cutter support member against the cutter blades, relative reciprocation of the cutter blades does not cause the cutter support member to wear. Therefore, the cutter support member is durable for use.

Further, because the fasteners are directly affixed to the friction blocks, the blades are not subject to looseness easily for long-time use.

DETAILED DESCRIPTION OF THE INVENTION

Figure 1:
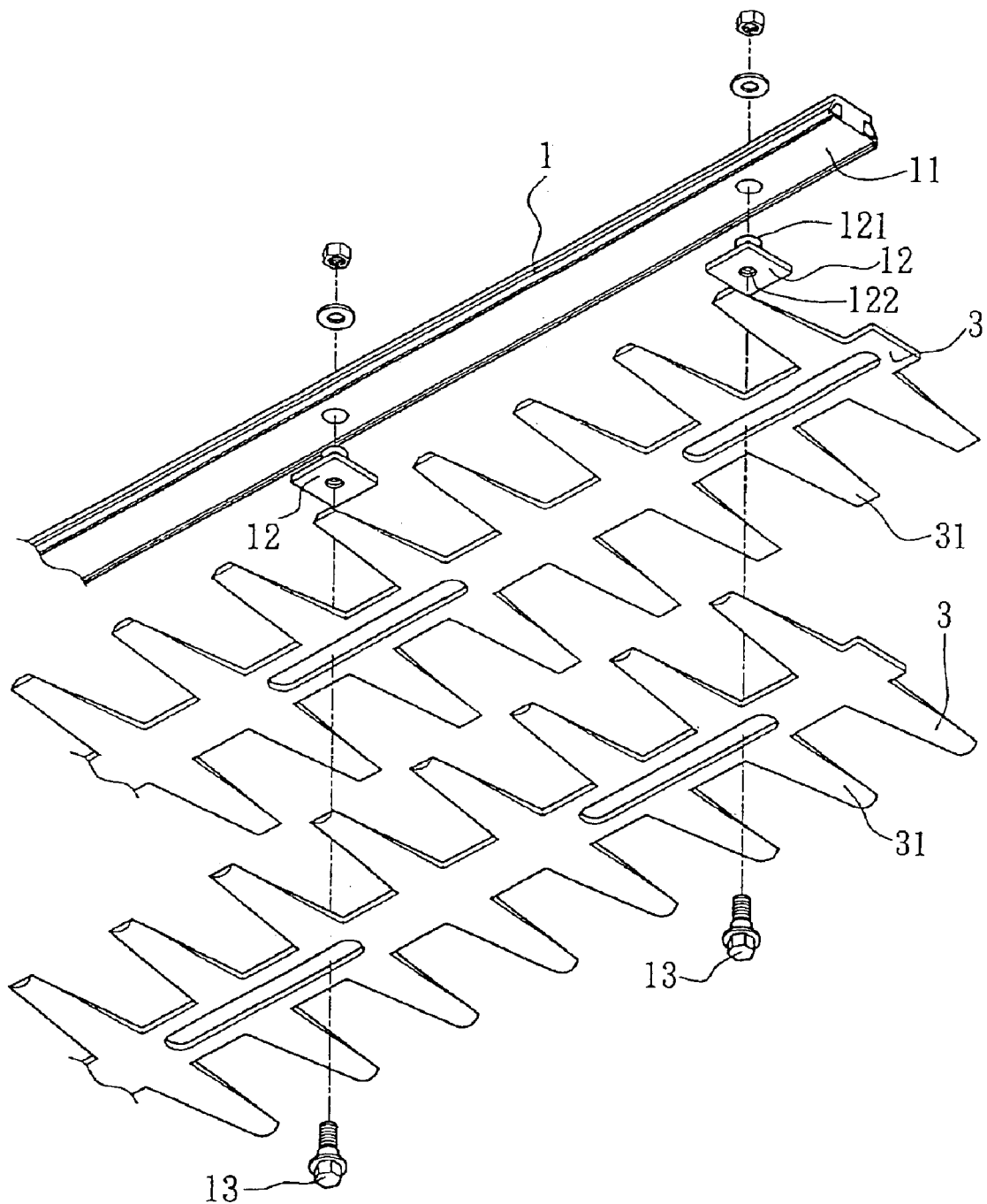
FIG. 1 is an exploded view of a first preferred embodiment of the present invention.
Figure 2:
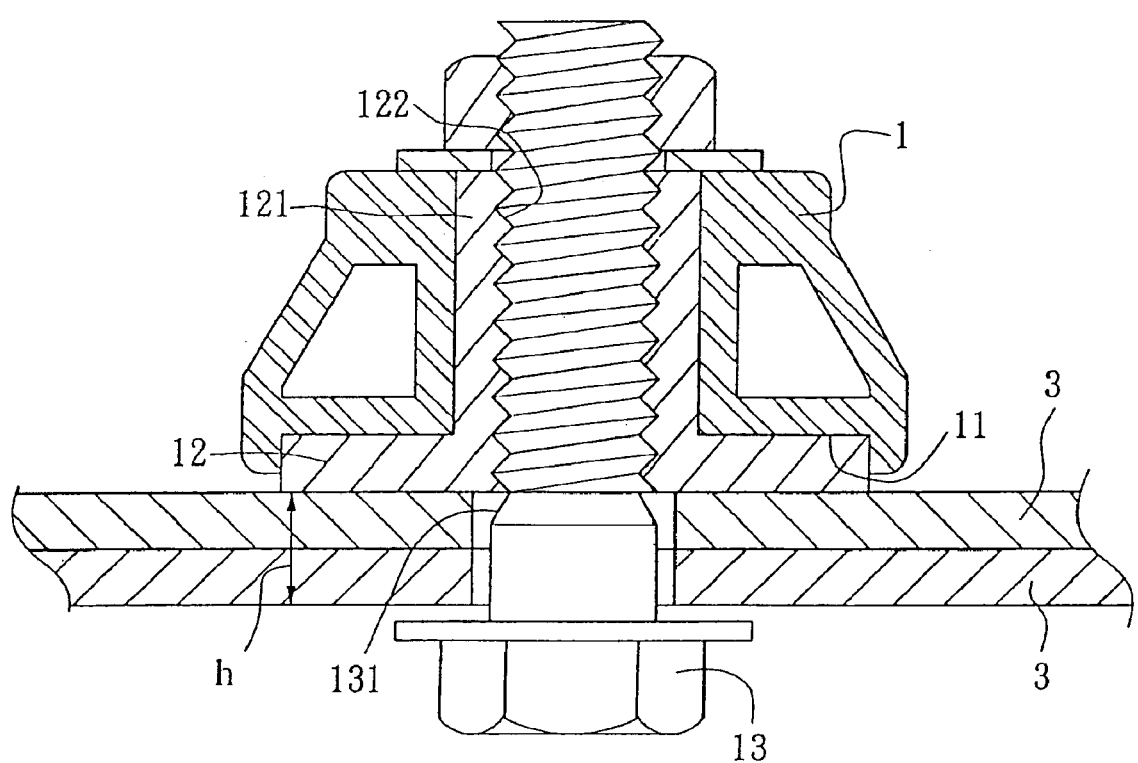
FIG. 2 is a partial enlarged sectional view of the first preferred embodiment of the present invention.

Referring to FIGS. 1–2, a cutter assembly for a hedge trimmer in accordance with a first preferred embodiment of the present invention is shown comprised of a cutter support member 1 having an end fastened to the hedge trimmer, and two cutter blades 3 arranged in a stack and longitudinally movably fastened to the cutter support member 1. Each of the cutter blades 3 includes two rows of teeth 31 longitudinally symmetrically disposed at two sides thereof. The cutter blades 3 are eccentrically driven by an electric motor (not shown) to alternately move relatively to each other, such that the teeth 31 are driven for intercrossed cutting movement to cut plants.

The cutter support member 1 is made of light metal, like aluminum or magnesium-aluminum alloy, having a groove 11 longitudinally extending on a bottom side thereof. A plurality of friction blocks 12 are fixedly mounted to the groove 11 at an equal interval. The friction blocks 12 are made of preferably hard iron, each having a stub rod 121 engaged to groove 11 of the cutter support member 1 and a center mounting hole 122 axially extended through the stub rod 121. According to this embodiment, the center mounting hole 122 is a screw hole. Fastening devices 13 are threaded into the center mounting holes 122 of the friction blocks 12 to secure the cutter blades 3 to the cutter support member 1, keeping one cutter blade 3 in contact with the friction blocks 12 (according to this embodiment, each of the fastening devices 13 is comprised of a screw bolt, a washer, and a nut). Each fastening device (screw bolt) 13 has a conical section 131, defining a distance H between the respective fastening device 13 and the respective friction block 12, such that the cutter blades 3 is relatively movable relatively to the fastening devices 13 via the grooves 11.

Because the cutter support member 1 is made of light metal, like aluminum or magnesium-aluminum alloy, the total weight of the cutter assembly is relatively reduced. Therefore, the user can hold the hedge trimmer conveniently with less effort. Because friction blocks 12 are provided between the cutter support member 1 and the blades 3 to keep the cutter support member 1 away from the cutter blades 3, relative reciprocation of the cutter blades 3 does not cause the cutter support member 1 to wear. Therefore, the cutter support member 1 is durable for use.

Further, because the fastening devices 13 are fastened to the center mounting holes 122 of the friction blocks 12 that are made of hard iron, the fastening devices 13 are not subject to looseness for long-time use.

Figure 3:
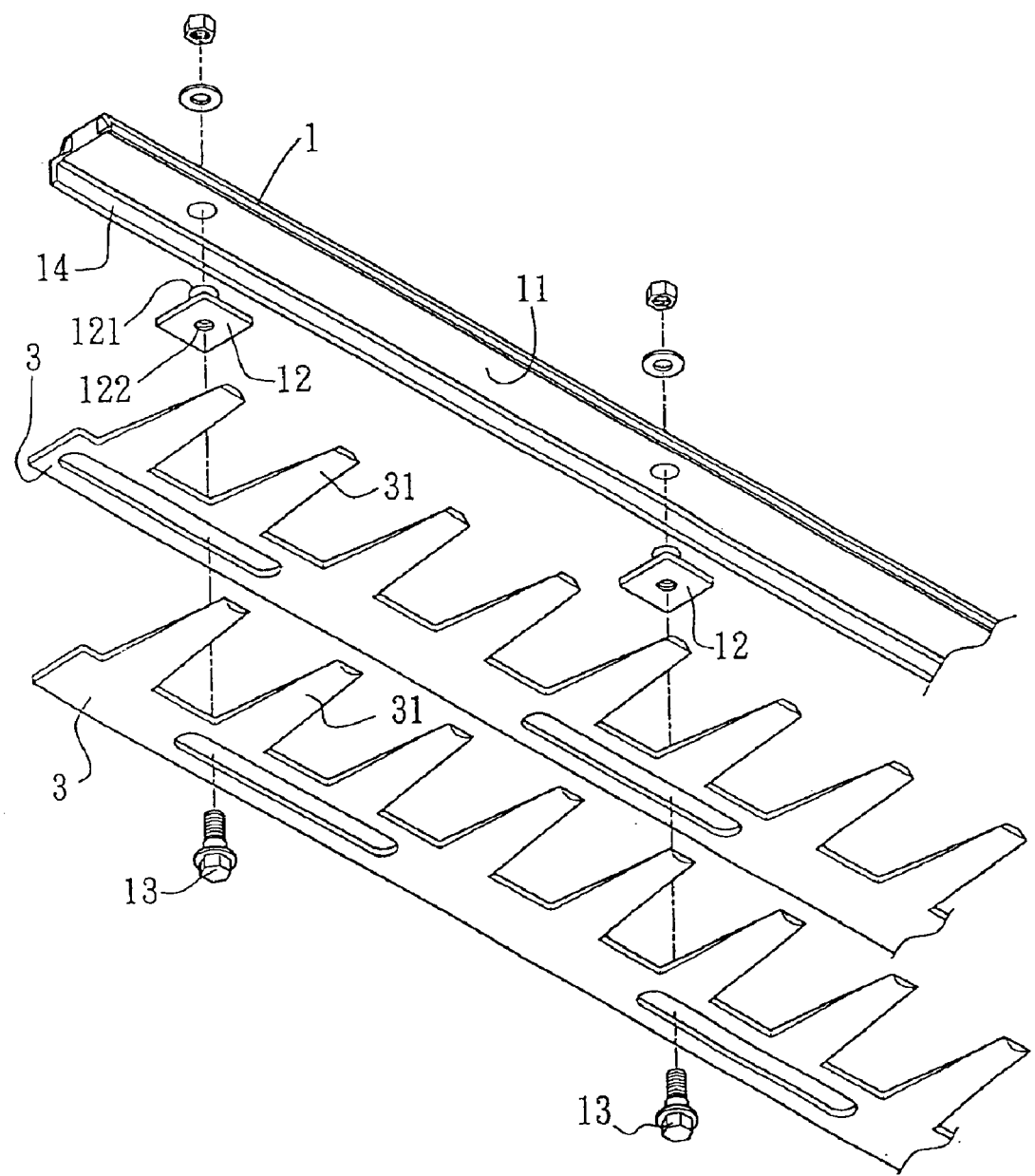
FIG. 3 is an exploded view of a second preferred embodiment of the present invention.
Figure 4:
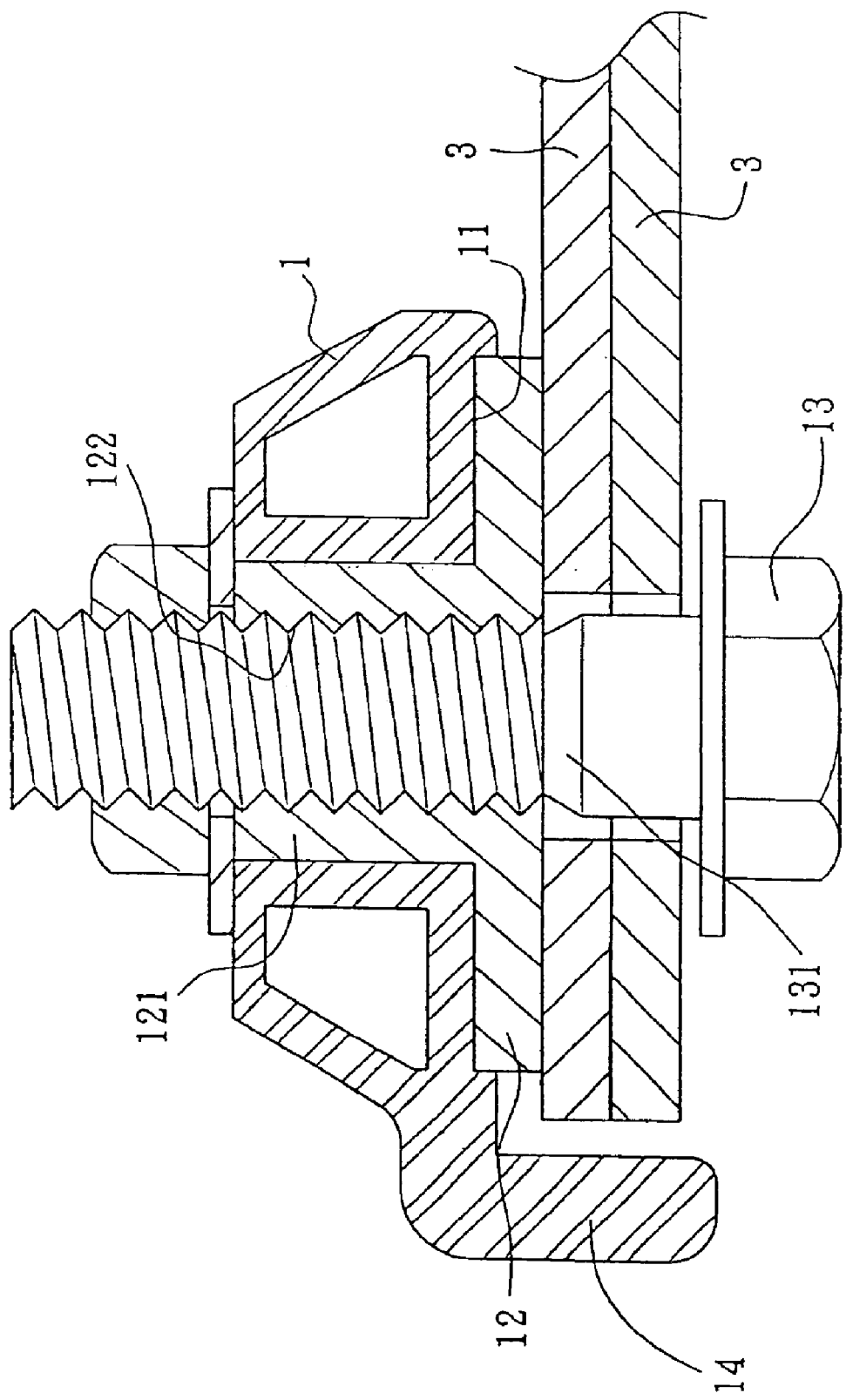
FIG. 4 is a partial enlarged sectional view of the second preferred embodiment of the present invention.
Figure 5:
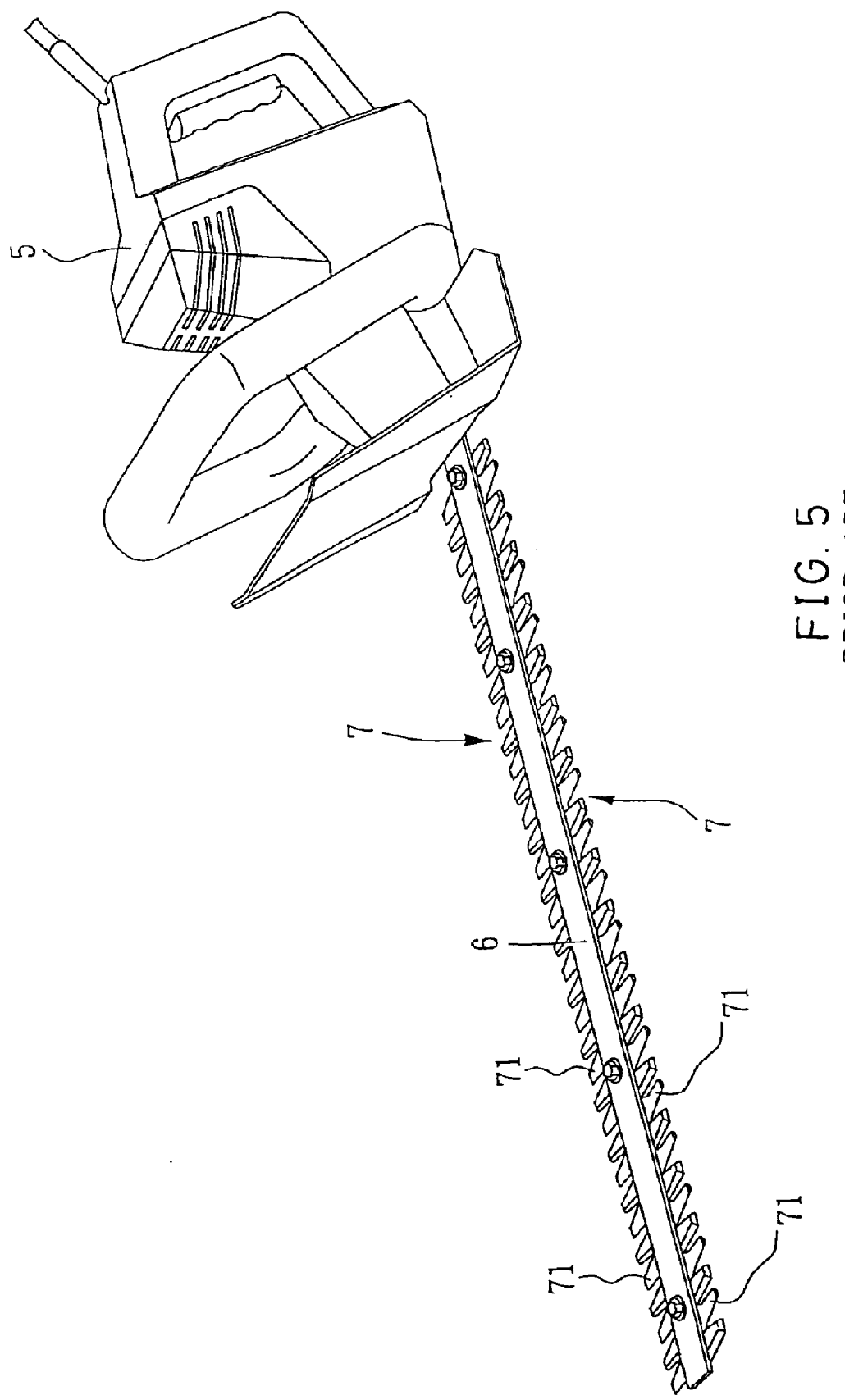
FIG. 5 is a perspective view of a conventional hedge trimmer.
Figure 6:
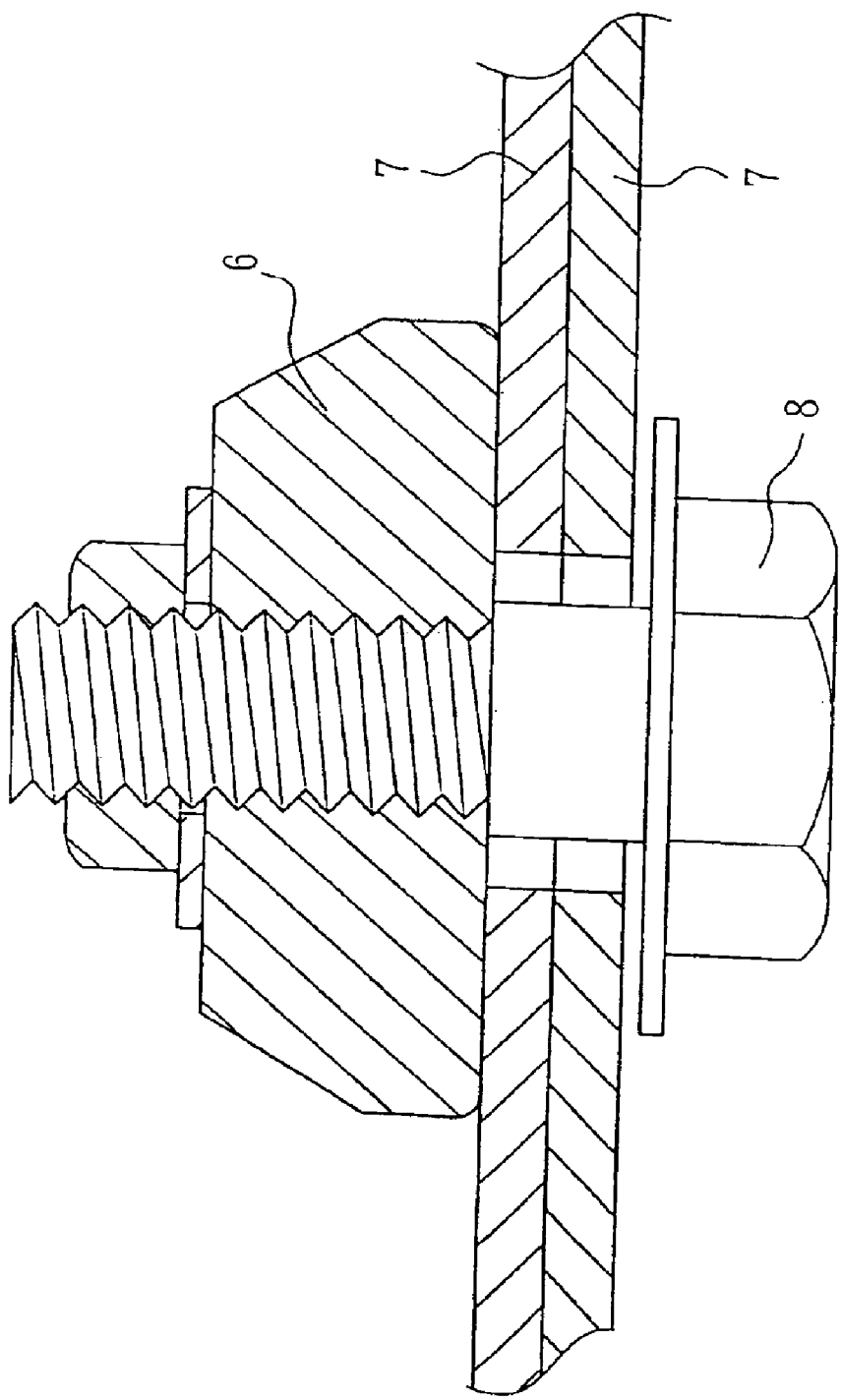
FIG. 6 is a partial enlarged sectional view of the conventional hedge trimmer.

FIGS. 3 and 4 show the cutter assembly of a second preferred embodiment of the present invention. According to this embodiment, each cutter blade 3 includes only one row of teeth 31 arranged at one side thereof, and the cutter support member 1 includes a longitudinal stop flange 14 extended along one side of the groove 11 for stopping the other toothless side of each cutter blade 3. Similar to the aforesaid first embodiment, the cutter support member 1 is made of light metal, like aluminum or magnesium-aluminum alloy; the friction blocks 12 are mounted to the groove 11 of the cutter support member 1, and fastening devices 13 are fastened to the center mounting holes 122 of the friction blocks 12 to secure the cutter blades 3 to the cutter support member 1.

What is claimed is:

1. A cutter assembly for a hedge trimmer, aid cutter assembly comprising:

a cutter support member having an end adapted to be fastened to said hedge trimmer;

two cutter blades arranged in a stack; and a plurality of friction blocks fixedly provided at a bottom side of said cutter support member and each having a stud rod for fastening said friction block to said cutter support member, and a center mounting hole running through said stud rod;

wherein said cutter support member is made of a light metal selected from a group consisting of aluminum and magnesium-aluminum alloy, and each of said friction blocks is made of a material more rigid than the light metal that said cutter support member is made.

2. The cutter assembly as defined in claim 1, wherein said cutter support member comprises a groove at a bottom side thereof; said friction blocks being disposed to said groove at an equal interval.

3. The cutter assembly as defined in claim 1, wherein each of said friction blocks further comprises a fastening device inserting through said blades and said center mounting hole for fastening said blades to said cutter support member.

4. The cutter assembly as defined in claim 3, wherein the center mounting hole of each said friction block is a screw hole; said fastening device comprises a screw bolt, a washer, and a nut, said screw bolt having a conical section for reciprocating movement of said blades.

5. The cutter assembly as defined in claim 1, wherein each of said cutter blades comprise two rows of teeth longitudinally symmetrically formed at two sides thereof.

6. The cutter assembly as defined in claim 1, wherein each of said cutter blades comprise a row of teeth longitudinally arranged at a side thereof; said cutter support member comprises a stop flange longitudinally extended along a side thereof for stopping the other toothless side of each said cutter blade.

7. The cutter assembly as defined in claim 1, wherein said friction blocks are spaced from one another at an equal distance.

* * * * *